United States Patent
Chen (10) Patent No.: US 10,012,342 B2
(45) Date of Patent: Jul. 3, 2018

(54) INTEGRATED SELFIE STICK

(71) Applicant: SHENZHEN SUISHENXIU FASHION ORIGINALITY TECHNOLOGY CO., LTD, Guangdong (CN)

(72) Inventor: Yongbin Chen, Guangdong (CN)

(*) Notice: Subject to any disclaimer, the term of this patent is extended or adjusted under 35 U.S.C. 154(b) by 0 days.

(21) Appl. No.: 15/569,091

(22) PCT Filed: Nov. 10, 2016

(86) PCT No.: PCT/CN2016/105271
§ 371 (c)(1),
(2) Date: Oct. 25, 2017

(87) PCT Pub. No.: WO2017/107692
PCT Pub. Date: Jun. 29, 2017

(65) Prior Publication Data
US 2018/0066792 A1    Mar. 8, 2018

(30) Foreign Application Priority Data
Dec. 23, 2015 (CN) .......................... 2015 2 1080484

(51) Int. Cl.
*F16M 11/10* (2006.01)
*F16M 13/04* (2006.01)
*H04M 1/13* (2006.01)
*G03B 17/56* (2006.01)
*H04N 5/232* (2006.01)

(52) U.S. Cl.
CPC ............ *F16M 11/10* (2013.01); *F16M 13/04* (2013.01); *G03B 17/561* (2013.01); *H04M 1/13* (2013.01); *H04N 5/232* (2013.01)

(58) Field of Classification Search
CPC ............................... F16M 11/10; H04N 5/232
See application file for complete search history.

(56) References Cited

U.S. PATENT DOCUMENTS 9,473,190 B1 * 10/2016 Sandlofer ............ G03B 17/563
2016/0381192 A1 * 12/2016 Sherman .............. G03B 17/563
455/575.3

* cited by examiner

*Primary Examiner* — Clayton E Laballe
*Assistant Examiner* — Linda B Smith
(74) *Attorney, Agent, or Firm* — Prakash Nama; Global IP Services, PLLC (57) ABSTRACT

The utility model relates to an integrated selfie stick. The selfie stick comprises a long-cylinder handle shell, an extendable stick fixed on the handle shell, a clamping device which can be folded relative to the extendable stick and a folding device for connecting an active end of the extendable stick and the clamping device, wherein a cavity for accommodating the clamping device is left between an inner wall of the handle shell and an outer wall of the extendable stick; and when the selfie stick is in a pack-up state, the clamping device is folded on the extendable stick, the active end of the extendable stick is retracted back to the handle shell, and the clamping device is placed in the cavity.

11 Claims, 8 Drawing Sheets

INTEGRATED SELFIE STICK

BACKGROUND OF THE INVENTION

The utility model relates to a selfie device, and particularly relates to an integrated selfie stick.

A selfie stick, which is a selfie stick sweeping the world, can extend and retract arbitrarily between a length of 20 cm-120 cm, and a user can realize multi-angle selfie through a remote controller only by fixing a mobile phone or an instamatic on an extendable stick. Usually, the selfie stick is equipped with a clamping device for clamping the mobile phone or a tablet computer and an extendable stick, wherein the clamping device is fixed at an active end of the extendable stick. The volume of the selfie stick should be reduced when not in use, so as to enhance the convenience; therefore, a folding selfie stick is emerged in the market. Generally, the folding selfie stick folds the clamping device on the extendable stick, but in such structure, the clamping device still have many protruding places, in this way, the integrity i relatively poor, and the appearance effect is had, and meanwhile, a hand bag/handbag is easily scratched by the protruding part of the clamping device when the folded selfie stick is put in the hand bag/handbag and others accommodating articles, therefore, its convenient use is poor, and the user experience is bad.

BRIEF SUMMARY OF THE INVENTION

The utility model aims at providing an integrated selfie stick to overcome defects of existing art, so as to improve the integrity, appearance and the convenient use.

The utility model adopts the following technical solutions to achieve the above purpose:

The integrated selfie stick comprises a long-cylinder handle shell, an extendable stick fixed on the handle shell, a clamping device which can be folded relative to the extendable stick and a folding device for connecting an active end of the extendable stick and the clamping device, wherein a cavity for accommodating the clamping device is left between an inner wall of the handle shell and an outer wall of the extendable stick; and when the selfie stick is in a pack-up state, the clamping device is folded on the extendable stick, the active end of the extendable stick is retracted back to the handle shell, and the clamping device is placed in the cavity.

Further, the handle shell comprises an inner shell and a transparent outer shell, wherein the inner shell is fixed in the outer shell, the extendable stick is fixed in the inner shell, and the cavity is located in between an inner wall of the inner shell and the outer wall of the extendable stick.

Further, a decorative ring is disposed on an outer wall of the handle shell and a groove for installing a key is arranged, on a position of the corresponding decorative ring on the outer wall of the handle shell.

Further, rotatable opening and closing or a dismountable top cover is arranged on the handle shell, and the top cover is covered on the handle shell when the selfie stick is in a pack-up state.

Further, the folding device comprises a connector for fixedly connecting the active end of the extendable stick of the selfie stick, a pin shaft is fixed on the connector, the clamping device comprises a substrate and a lower clamp plate fixed at a lower part of the substrate, a connecting cylinder for the pin shaft to penetrate through is arranged at a bottom surface of the lower clamp plate, and a channel for the lower clamp plate to pass through when the clamping device overturns round the pin shaft is arranged between the pin shaft of the connector and a body of the connector.

Further, the clamping device further comprises an upper damping arm which can move relative to the substrate, and the upper clamping arm is disposed on an upper part of the substrate.

Further, the upper clamping arm is equipped with two symmetrical parts, an accommodation tank for accommodating the extendable stick when folding is formed between the two parts.

Further, two hangers arranged symmetrically are arranged on the connector, the pin shaft penetrates through the two hangers, and the channel is surrounded by the two hangers, the pin shaft and the body of the connector.

Further, a cross section of one end of the pin shaft is pentagonal, and a pentagonal through hole for nesting in a pentagonal end of the pin shaft is arranged on the hanger.

Further, the folding device further comprises a thread column and a thread cylinder with an internal thread hole, wherein an external thread is arranged at a front end of the thread column, and a rear end of the thread column is nested in the pin shaft; and when the clamping device is locked the external thread of the thread column is in a threaded connection with the internal thread hole of the thread cylinder, a cylinder opening of the thread cylinder abuts against an outer wall of the connecting cylinder, and a mutual pressing force is generated by an inner wall of the connecting cylinder and the pin shaft under an effect of a trust of the thread cylinder, to realize locking.

Further, the connecting cylinder is divided into two parts with the same size axially along the pin shaft, and a gap for the thread column to penetrate through and allowing the thread column to rotate round a center shaft of the pin shaft is left between the two parts.

Further, a slot for accommodating a connection plug is arranged in a middle position of a lower part of the substrate.

Compared with the existing art, the utility model has the beneficial effects that: the extendable stick and the clamping device are surrounded by a cylindrical shell in the utility model, in this way, the clamping device cannot have the protruding part; and the selfie stick is just a complete long cylinder when packing up, therefore, the integrity is very good, and the appearance effect is greatly improved; and moreover, it is not scratched when putting in a hand bag/hangbag, therefore, the convenient use and user experience are improved.

DETAILED DESCRIPTION OF THE INVENTION

Further introduction and description are made to the technical solution of the utility model below in combination with the specific embodiments, so as to understand the technical content of the utility model more fully.

The specific structure of embodiment of the utility model is shown in FIG. 1-FIG. 10.

Figure 1:
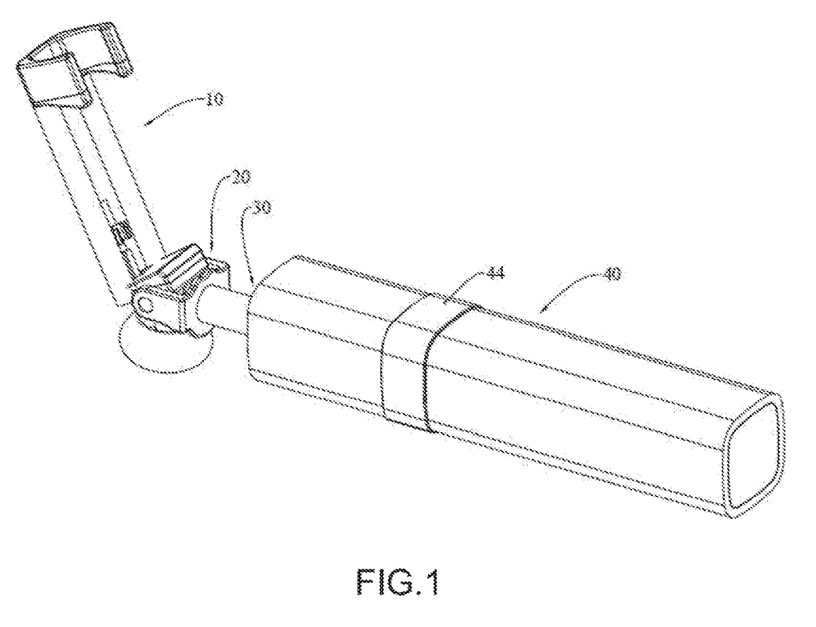
FIG. 1 is a space diagram of a selfie stick (an extendable stick is stretched out, and a clamping device is unfolded)
Figure 2:
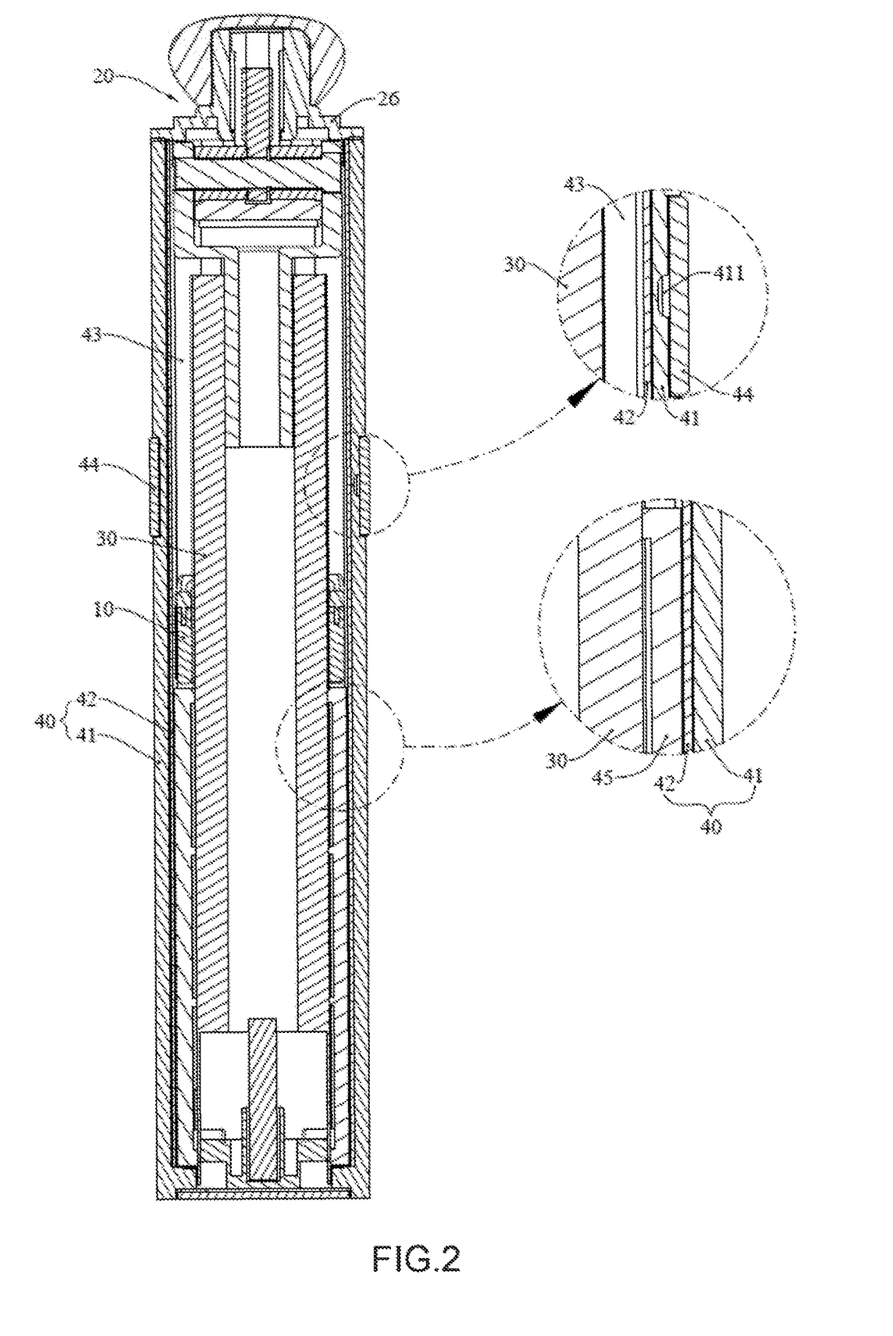
FIG. 2 is a section view of a selfie stick.
Figure 3:
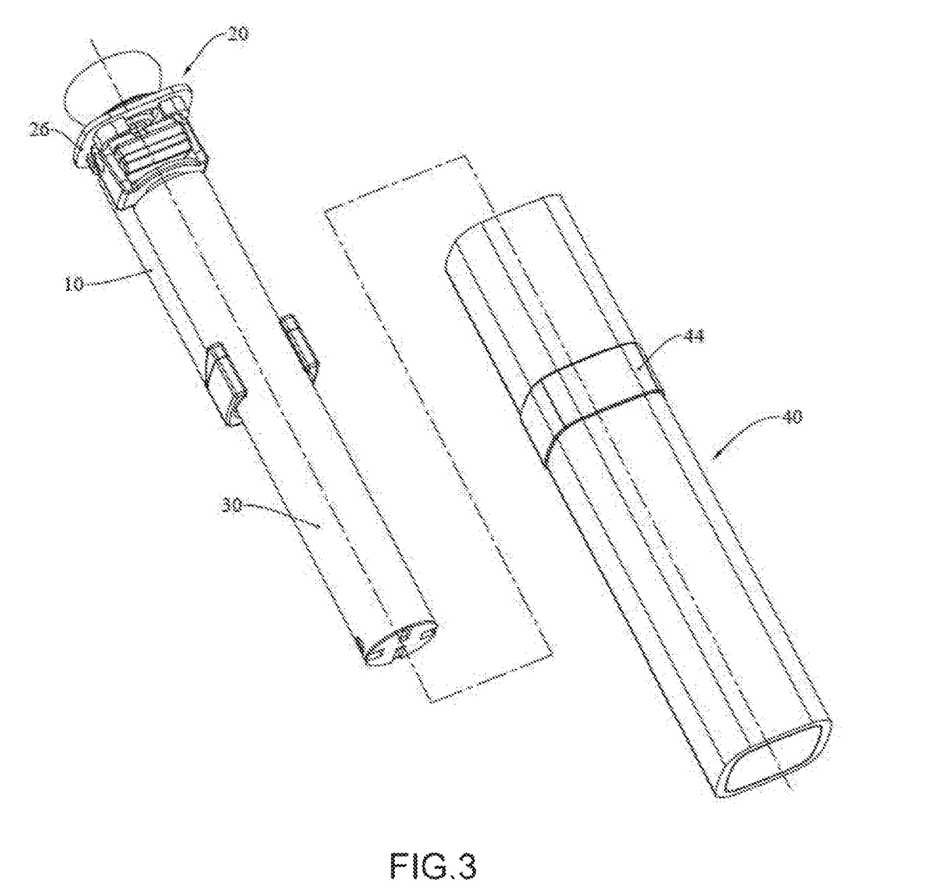
FIG. 3 is a decomposition diagram of a selfie stick.

As shown in FIG. 1-FIG. 3, a selfie stick of the present embodiment comprises a long-cylinder handle shell 40, an extendable stick 30 fixed on the handle shell 40, a clamping device 10 which can be folded relative to the extendable stick 30 and a folding device 20 for connecting an active end of the extendable stick 30 and the clamping device 10.

As shown in FIG. 1, a section of the hand shell 40 in the present embodiment is square, and can also be round, polygonal and others in other embodiments. As shown in FIG. 2, the handle shell 40 comprises an inner shell 42 and a transparent outer shell 41, wherein the inner shell 42 is fixed in the outer shell 41, the extendable stick 30 is fixed in the inner shell 41. As shown in FIG. 1 and FIG. 2, a decorative ring 44 is disposed on an outer wall of the handle shell 40, and a groove 411 (FIG. 2) for installing a key is arranged on a position of the corresponding decorative ring 44 on the outer wall of the handle shell 40.

As shown in FIG. 2, a cavity 43 for accommodating the clamping device 10 is left between an inner wall of the inner shell 42 of the handle shell 40 and an outer wall of the extendable stick 30. A fixed sleeve 45 for fixing the extendable stick 30 is further arranged in the inner shell 42. As shown in FIG. 1, when the selfie tick is in a full unfolding state, the active end of the extendable stick 30 stretches out, and clamping device 10 rotates and open from the extendable stick 30. And when the selfie stick is packed up, clamping device 10 is folded toward the extendable stick 30, and then, the active end of the extendable stick 30 is pushed toward the handle shell 40. Finally, when the selfie stick is in a full pack-up state, the clamping device 10 is folded on the extendable stick 30, the active end of the extendable stick 30 is retracted back to the handle shell 40, and the clamping device 10 is placed in the cavity 43.

In other embodiments, rotatable opening and closing or a dismountable top cover is arranged on the handle shell, and the top cover is covered on the handle shell to cover the folding device and the clamping device when the selfie stick is in the full pack-up state. And in the present embodiment, as shown in FIG. 2 and FIG. 3, a top cover 26 is arranged on the folding device 20 to play a role of protection and dust prevention.

Figure 4:
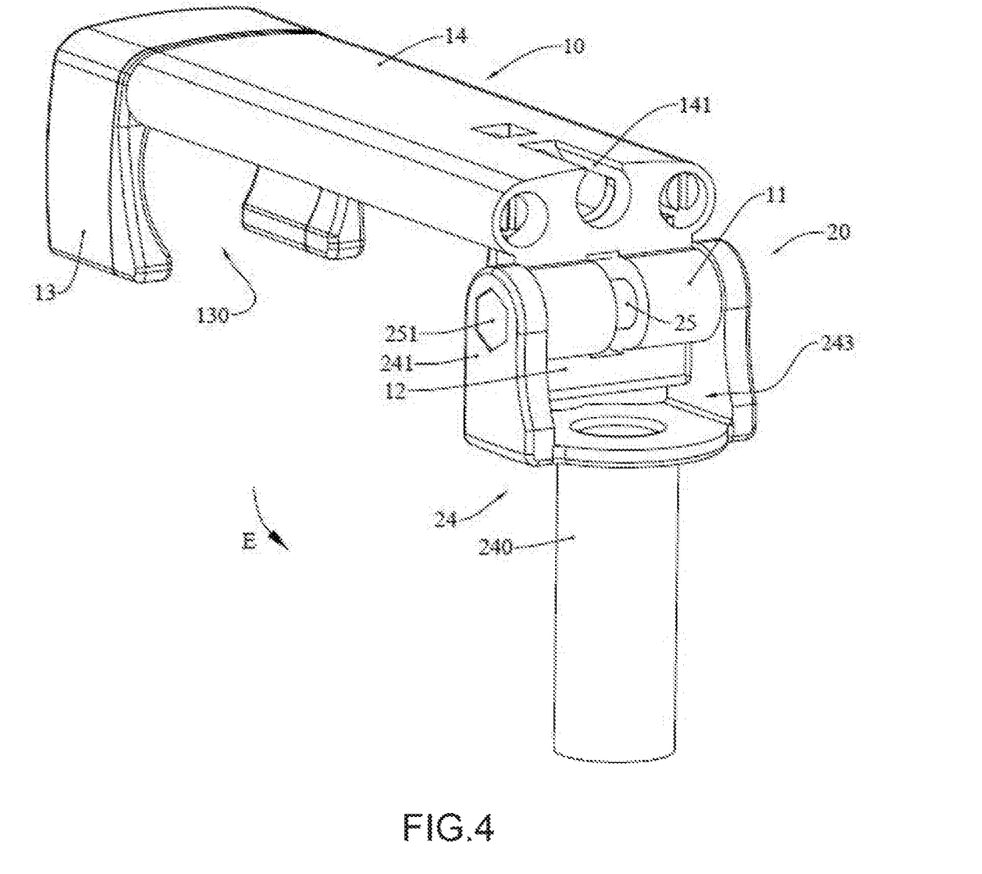
FIG. 4 is a space diagram illustrating assembling of a clamping device and a folding device (a thread column and a thread cylinder are omitted)
Figure 5:
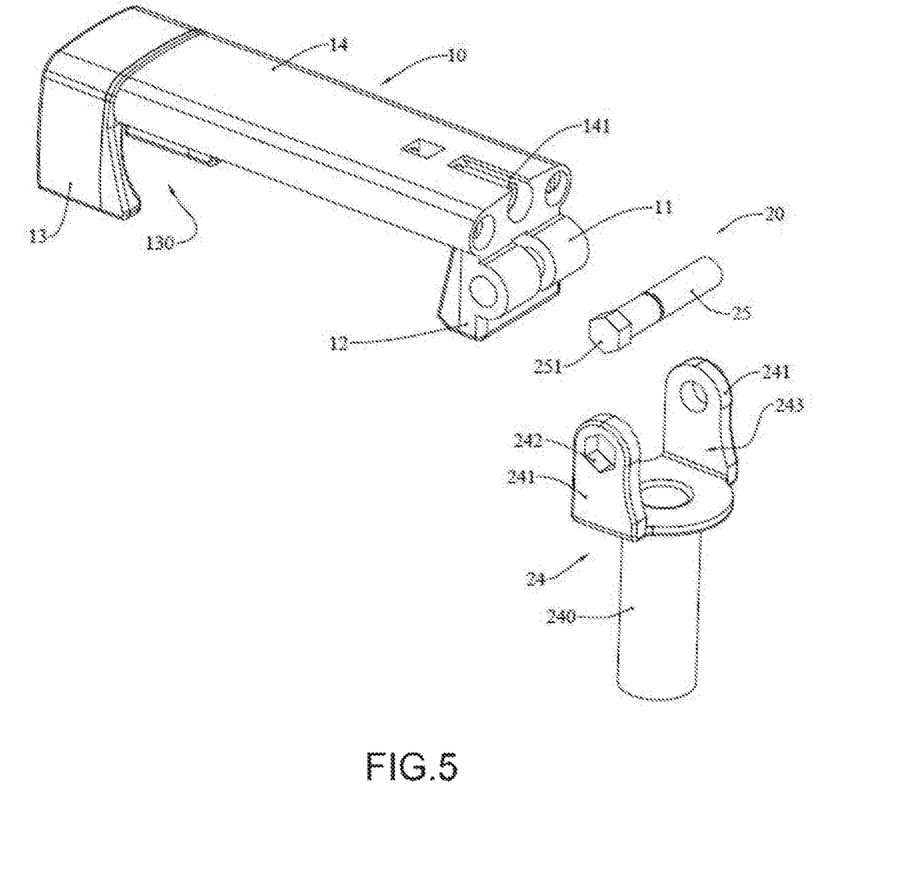
FIG. 5 is a decomposition diagram of a clamping device and a folding device (a thread column and a thread cylinder are omitted)

As shown in FIG. 4 and FIG. 5, the clamping device 10 comprises a substrate 14, a lower clamp plate 12 fixed at a lower part of the substrate 14, and an upper clamping arm 13. The upper clamping arm 13 is disposed on an upper part of the substrate 14. The upper clamping arm 13 and the lower clamp plate 12 are configured to clamp two sides of a mobile phone or a tablet computer and other portable shooting equipment. The upper clamping arm 13 can move relative to the substrate 14, so that a spacing between the upper clamping arm 13 and the lower clamp plate 12 is adjustable, so as to adapt to the portable shooting equipment having different widths. Wherein the upper clamping arm 13 can move relative to the substrate 14, and the lower clamp plate 12 is relatively fixed with the substrate 14. A specific structure that the upper clamping arm 13 can move relative to the substrate 14 belongs to the existing art, so no more detailed description is provided here.

The selfie stick can realize the control of the shooting equipment through a line control, so, a connection and a connection plug are inevitably provided. A slot 141 for accommodating the connection plug is arranged in a middle position of a lower part of the substrate 14, so as to enable the connection plug not to shake arbitrarily, as shown in FIG. 4 and FIG. 5.

As shown in FIG. 4 and FIG. 5, the upper clamping arm 13 is equipped with two symmetrical parts, and an accommodation tank 130 for accommodating the extendable stick when folding is formed between the two parts.

Figure 10:
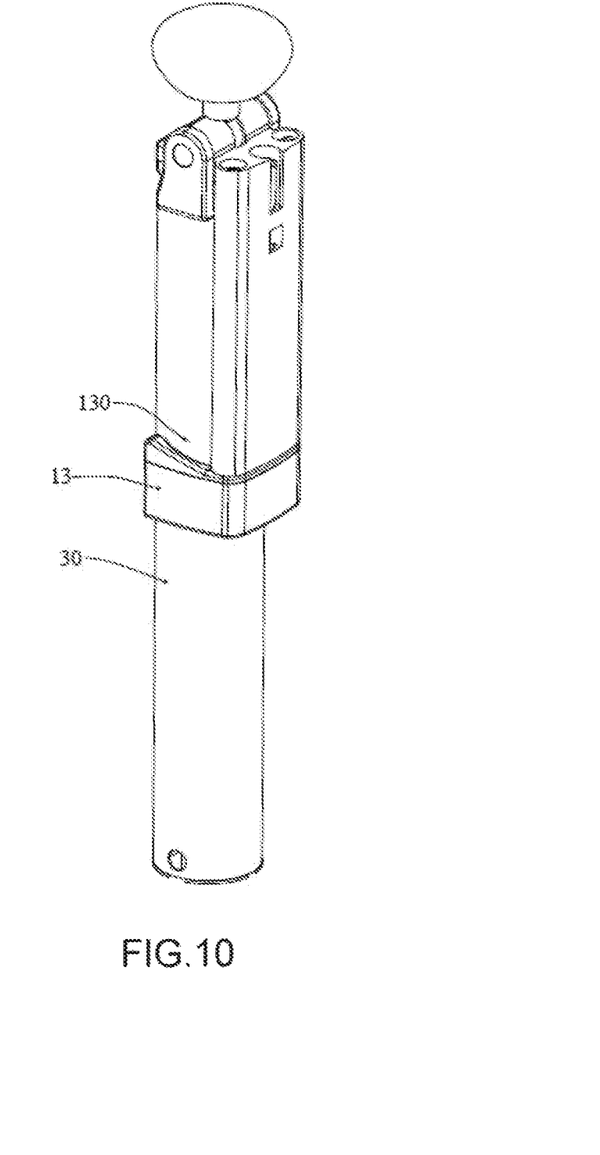
FIG. 10 is a space diagram illustrating assembling of an extendable clamping device and a folding device.

As shown in FIG. 4 and FIG. 5, the folding device 20 comprises a connector 24 configured to fixedly connected with the active end of the extendable stick. The connector 24 comprises a body 240 and two hangers 241 arranged symmetrically. A pin shaft 25 is fixed on the connector 24, and penetrates through the two hangers 241. A connecting cylinder 11 for the pin shaft 25 to penetrate through is arranged at a bottom surface of the lower clamp plate 12. A channel 243 for the lower clamp plate 12 to pass through when the clamping device 10 overturns round the pin shaft 25 is arranged between the pin shaft 25 of the connector 24 and the body 240 of the connector 24, and is surrounded by the two hangers 241, the pin shaft 25 and the body 240 of the connector 24. When the clamping device 10 is folded along a direction of FIG. 4 until to be fully folded (namely, the accommodation tank 130 of the upper clamping arm 13 shown in FIG. 10 is nested on the extendable stick 30), the lower clamp plate 12 is disposed in the channel 243, therefore, the folding area can be greatly reduced.

The axial rotational degree of freedom of the pin shaft 25 is zero. As shown in FIG. 4 and FIG. 5, a cross section of an end 251 of the pin shaft 25 is pentagonal, and a pentagonal through hole 242 for nesting in a pentagonal end 251 of the pin shaft 25 is arranged on the hanger 241. After the end 251 of the pin shaft 25 is inserted into the through hole 242 of the hanger 241, the pin shaft 25 cannot rotate relative to the hanger 241. Of course, in other embodiments, the two ends of the pin shaft can be made into pentagon.

Figure 6:
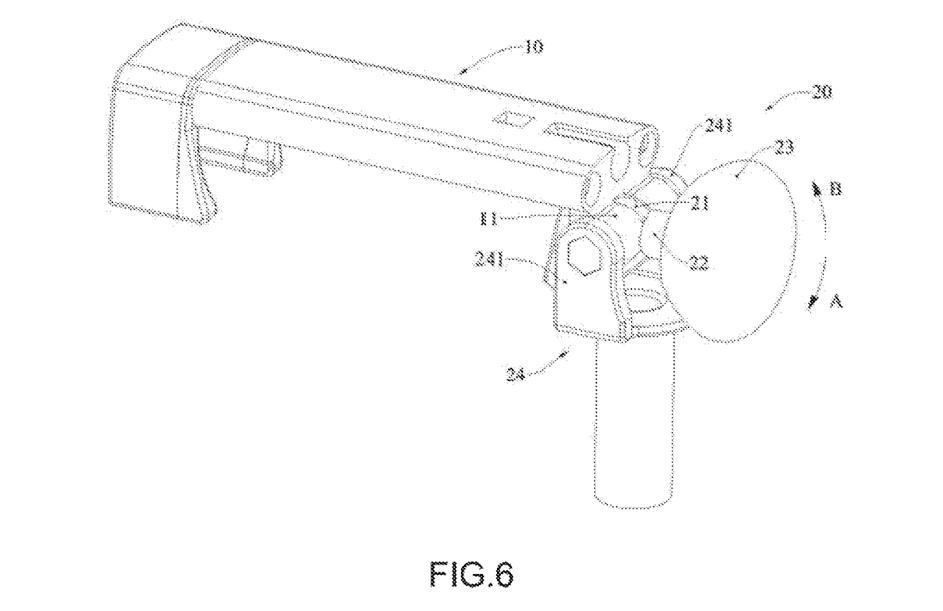
FIG. 6 is a space diagram illustrating assembling of a clamping device and a folding device.
Figure 7:
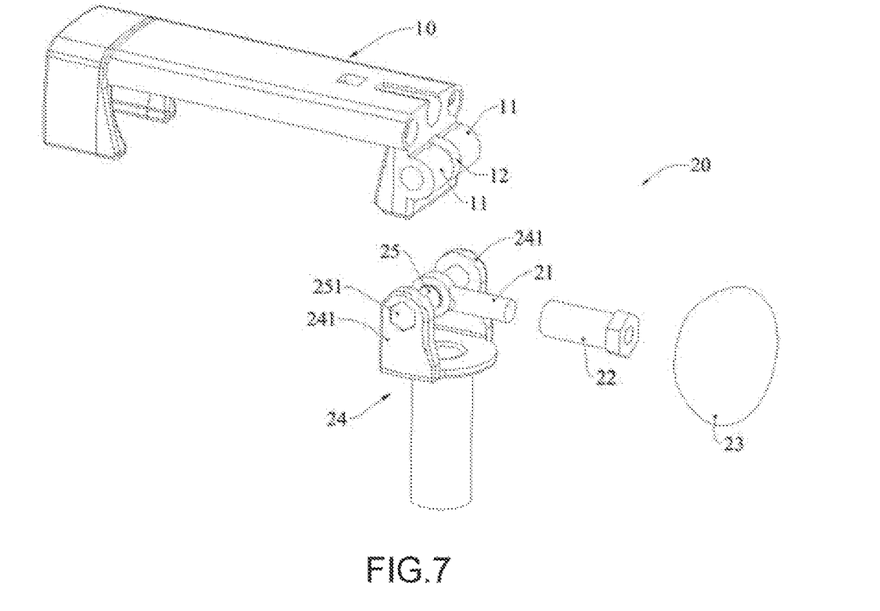
FIG. 7 is a decomposition diagram of a damping device and a folding device.

As shown in FIG. 6 and FIG. 7, the folding device 20 of the present embodiment further comprises a thread column 21 and a thread cylinder 22 with an internal thread hole.

As shown in FIG. 6-FIG. 9, an external thread is arranged at a front end of the thread column 21, and a rear end of the thread column 2 is nested in the pin shaft 25; and when the clamping device is locked; and the thread column 21 can rotate round a center shaft of the pin shaft 25. The internal thread hole of the thread cylinder 22 is matched with an external thread of the thread column 21. That is, the external thread of the thread column 21 is in a threaded connection with the internal thread hole of the thread cylinder 22, therefore, the thread column 21 can screw in or out of the internal thread hole of the thread cylinder 22.

Figure 8:
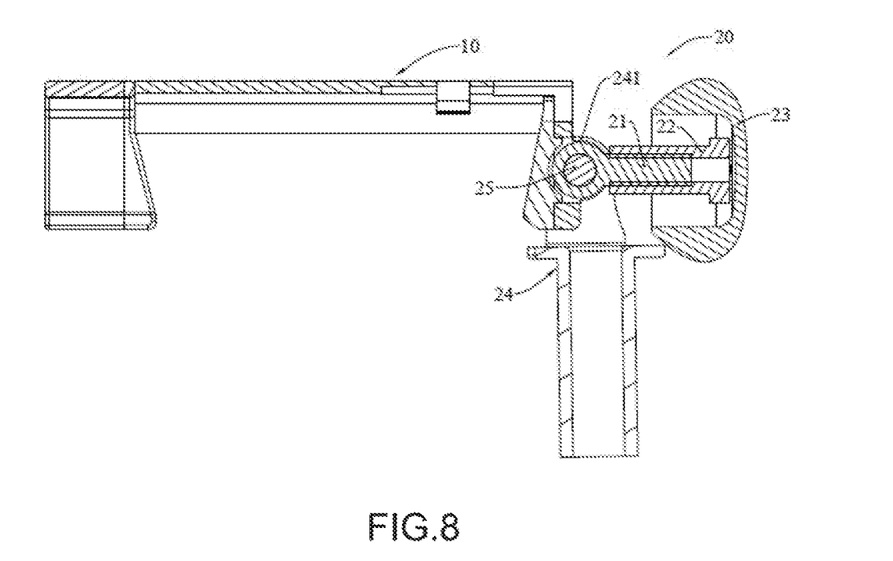
FIG. 8 is a section view illustrating assembling of a clamping device and a folding device.
Figure 9:
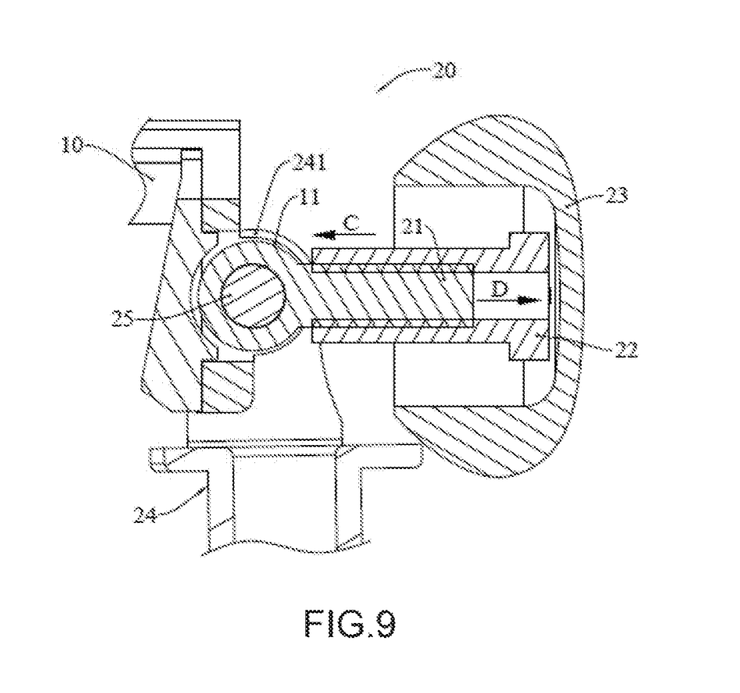
FIG. 9 is a partial enlarged drawing of FIG. 8.

As shown in FIG. 7-FIG. 9, a handle 23 is fixed at an outer end of the thread cylinder 22, which can improve the usage experience when screwing the thread cylinder 22 or pulling the thread cylinder 22, and can also improve the appearance effect.

As shown in FIG. 6 and FIG. 7, a connecting cylinder 11 for the pin shaft 25 to penetrate through is arranged at an end of the clamping device 10. The connecting cylinder 11 is divided into two parts with the same size axially along the pin shaft 25, and a gap 12 for the thread column 21 to penetrate through and allowing the thread column 21 to rotate round a center shaft of the pin shaft 25 is left between the two parts.

Locking and unlocking process:

1) When locking the clamping device 10, the thread cylinder 22 is screwed in clockwise (a direction A in FIG. 6) by twisting the handle 23, until that a cylinder opening of the thread cylinder 22 abuts against an outer wall of the connecting cylinder 11 and the thread cylinder 22 cannot be screwed in; and at this time, the thread cylinder 22 generates a thrust (a direction C in FIG. 9) to the connecting cylinder 11, and the thread column 21 generates pull (a direction D in FIG. 9) to the stationary pin shaft 25. A mutual pressing force is generated by an inner wall of the connecting cylinder 11 and the outer wall of the pin shaft 25, which causes that the clamping device 10 can be overturned by overcoming the big frictional force between the two, therefore, the clamping device 10 is locked, and cannot be overturned.

2) When unlocking the clamping device 10, the pressing force between the inner wall of the connecting cylinder 11 and the outer wall of the pin shaft 25 is gradually decreased by screwing out the thread cylinder 22 anticlockwise (the direction B in FIG. 6) by twisting the handle 23, the friction force between the two is also gradually decreased, and when the friction force is changed into zero, the clamping device 10 has been fully unlocked, without restraint, and can be overturned easily round the pin shaft 25.

For the above statement, the further description is only made to the technical content of the utility model with the embodiments, so that the reader can understand more easily, but it does not represent that the embodiments of the utility model is only limited to this. Any technical extension or recreation made according to the utility model is protected by the utility model.

What is claimed is:

1. An integrated selfie stick is comprised of a long-cylinder handle shell, an extendable stick fixed on the handle shell, a clamping device which can be folded relative to the extendable stick and a folding device for connecting, an active end of the extendable stick and the clamping device, wherein a cavity for accommodating the clamping device is left between an inner wall of the handle shell and an outer wall of the extendable stick; and when the selfie stick is in a pack-up state, the clamping device is folded on the extendable stick, the active end of the extendable stick is retracted back to the handle shell, and the clamping device is placed in the cavity.

2. The integrated selfie stick according to claim 1, wherein the handle shell comprises an inner shell and a transparent outer shell, wherein the inner shell is fixed in the outer shell, the extendable stick is fixed in the inner shell, and the cavity is located in between an inner wall of the inner shell and the outer wail of the extendable stick.

3. The integrated selfie stick according to claim 1, wherein a decorative ring is disposed on an outer wall of the, handle shell, and a groove for installing a key is arranged on a position of the corresponding decorative ring on the outer wall of the handle shell.

4. The integrated selfie stick according to claim 1, wherein rotatable opening and closing or a dismountable top cover is arranged on the handle shell and the top cover is covered on the handle shell when the selfie stick is in a pack-up state.

5. The integrated selfie stick according to claim 1, wherein the folding device comprises a connector for fixedly connecting the active end of the extendable stick of the selfie stick, a pin shaft is fixed on the connector, the clamping device comprises a substrate and a lower clamp plate fixed at a lower part of the substrate, a connecting cylinder for the pin shaft to penetrate through is arranged at a bottom surface of the lower clamp plate, and a channel for the lower clamp plate to pass through when the clamping device overturns round the pin shaft is arranged between the pin shaft of the connector and a body of the connector.

6. The integrated selfie stick according to claim 5, wherein the clamping device further comprises an upper clamping arm which can move relative to the substrate and the upper clamping arm is disposed on an upper part of the substrate.

7. The integrated selfie stick according to claim 6, wherein the upper clamping arm is equipped with two symmetrical parts, an accommodation tank for accommodating the extendable stick when folding is formed between the two parts.

8. The integrated selfie stick according to claim 5, wherein two hangers arranged symmetrically are arranged on the connector, the pin shaft penetrates through the two hangers, and the channel is surrounded by the two hangers, the pin shaft and the body of the connector.

9. The integrated selfie stick according to claim 8, wherein a cross section of one end of the pin shaft is pentagonal, and a pentagonal through hole for nesting in a pentagonal end of the pin shaft is arranged on the hanger.

10. The integrated selfie stick according to any of claims 5-9, wherein the folding device further comprises a thread column and a thread cylinder with an internal thread hole, wherein an external thread is arranged at a front end of the thread column, and a rear end of the thread column is nested in the pin shaft; and when the clamping device is locked, the external thread of the thread column is in a threaded connection with the internal thread hole of the thread cylinder, a cylinder opening of the thread cylinder abuts against an outer wall of the connecting cylinder, and a mutual pressing force is generated by an inner wall of the connecting cylinder and the pin shaft under an effect of a trust of the thread cylinder, to realize locking.

11. The integrated selfie stick according to claim 10, wherein the connecting cylinder is divided into two parts with the same size axially along the pin shaft, and a gap for the thread column to penetrate through and allowing the thread column to rotate round a center shaft of the pin shaft is left between the two parts.

* * * * *